United States Patent
Hosoda

(10) Patent No.: US 8,294,787 B2
(45) Date of Patent: Oct. 23, 2012

(54) DISPLAY DEVICE HAVING ALBUM DISPLAY FUNCTION

(75) Inventor: Jun Hosoda, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 1079 days.

(21) Appl. No.: 11/891,749

(22) Filed: Aug. 13, 2007

(65) Prior Publication Data

US 2008/0049148 A1    Feb. 28, 2008

(30) Foreign Application Priority Data

Aug. 23, 2006    (JP) .................................. 2006-226871

(51) Int. Cl.
*H04N 5/76* (2006.01)
*H04N 5/225* (2006.01)
*H04N 5/222* (2006.01)

(52) U.S. Cl. .............. 348/231.2; 348/207.1; 348/333.05

(58) Field of Classification Search ................ 348/207.1, 348/231.99, 231.2, 231.6, 333.01, 333.05, 348/333.11
See application file for complete search history.

(56) References Cited

U.S. PATENT DOCUMENTS

| | | | |
|---|---|---|---|
| 6,229,566 B1* | 5/2001 | Matsumoto et al. | 348/231.2 |
| 6,486,895 B1* | 11/2002 | Robertson et al. | 715/776 |
| 6,683,649 B1* | 1/2004 | Anderson | 348/333.05 |
| 7,616,235 B2* | 11/2009 | Shibuya et al. | 348/231.2 |
| 2002/0060740 A1* | 5/2002 | Kato | 348/232 |
| 2003/0135649 A1* | 7/2003 | Buckley et al. | 709/247 |
| 2005/0225644 A1 | 10/2005 | Shibuya et al. | |
| 2006/0066717 A1* | 3/2006 | Miceli | 348/14.09 |
| 2006/0282760 A1* | 12/2006 | Tanaka | 715/509 |
| 2007/0276865 A1* | 11/2007 | Bodin et al. | 707/104.1 |
| 2008/0049148 A1* | 2/2008 | Hosoda | 348/739 |

FOREIGN PATENT DOCUMENTS

| | | |
|---|---|---|
| JP | 2002-199334 A | 7/2002 |
| JP | 2005-303453 A | 10/2005 |
| JP | 2006-78664 A | 3/2006 |

OTHER PUBLICATIONS

Korean Office Action dated Jan. 12, 2009 and English translation thereof issued in a counterpart Korean Application No. 10-2008-7006248.

(Continued)

*Primary Examiner* — Timothy J Henn
(74) *Attorney, Agent, or Firm* — Holtz, Holtz, Goodman & Chick, PC

(57) ABSTRACT

Disclosed is a digital camera 2 including: a communication control unit 24 that receives album information A transmitted from a display control device and formed of a plurality of JPEG image files and a play list indicating a linkage among the files; a recording medium 25 that records the album information; an image display unit 222 that displays images of the plurality of recorded JPEG image files; and a CPU 261 that performs processing for displaying, on the image display unit, images of JPEG image files associated with one another by image linkage information of the play list among the plurality of JPEG image files based on an input of an image switching instruction from the operation input unit 231.

10 Claims, 14 Drawing Sheets

OTHER PUBLICATIONS

Document A: Casio Computer Co., Ltd. Apr. 23, 2003; Image transferring software "Photo Transport" for "EXILM" series; web page.
Document B: Jan. 28, 2004; web page by Casio Computer Co., Ltd. "Photo Transport".
Document C: printed a help file of the "Photo Transport".

Notification Concerning Transmittal of International Search Report and Written Opinion of the International Searching Authority, Dated Nov. 7, 2007, for PCT/JP2007/066948, 9 sheets.
Japanese Office Action dated May 25, 2010 and English translation thereof, issued in counterpart Japanese Application No. 2006-226871.

* cited by examiner

```
<?xml version="1.0" encoding="UTF-8" ?>
- < album >
- < source >
    < uri >http://www.myPC.com/FolderX/
    presentation/original.ppt</uri>
    < title >my_original_presentation</title>
    < author >Jun Hosoda </author>
    < date >2005-08-31 </date>
    < img view="thumbnail" >PREVIEW/thumb.JPG </img>
    < page>5 
  </source>

- < contents >
    < img page="1" >CIMG0001.JPG</img>
    < img page="2" >CIMG0002.JPG</img>
    < img page="3" >CIMG0003.JPG</img>
    < img page="4" >CIMG0004.JPG</img>
    < img page="5" >CIMG0005.JPG</img>

</contents>
</album>
```

```
< ?xml version="1.0" encoding="UTF-8" ? >
- < album >
- < source >
    < uri >http://www.myPC.com/FolderX/
    presentation/original.ppt</uri>
    < title >my_original_presentation</title>
    < author >Jun Hosoda </author>
    < date >2005-08-31 </date>
    < img view="thumbnail" >PREVIEW/thumb.JPG </img>
    < page>5 
  < /source >

- < contents >
    < img page="1" usemap="#maplink">CIMG0001.JPG</img>
    < img page="2" >CIMG0002.JPG</img>
    < img page="3" >CIMG0003.JPG</img>
    < img page="4" >CIMG0004.JPG</img>
    < img page="5" >CIMG0005.JPG</img>
      < map name="maplink">
        < area shape="rect" coords="99,11,157,15" herf="#2" />
        < area shape="rect" coords="99,16,157,20" herf="#3" />
        < area shape="rect" coords="99,21,157,25" herf="#4" />
        < area shape="rect" coords="99,26,157,30" herf="#5" />

< /map >

< /contents >
< /album >
```

DISPLAY DEVICE HAVING ALBUM DISPLAY FUNCTION

BACKGROUND OF THE INVENTION

1. Field of the Invention

The present invention relates to a display system that displays an image, and to a display device, a transmission device, a recording medium, a display method, and a transmission method, which are related to the display system.

2. Description of the Related Art

Heretofore, there has been known an imaging device, such as a digital camera, that takes a still image and moving picture of a subject, and stores the taken still image and moving picture in a storage unit such as a memory card and a built-in memory.

Incidentally, in recent years, a display system has been developed, that converts document information of a slide show or the like, which is stored in a personal computer (PC), into a JPEG file, transfers the document information to the imaging device, and browses the document information by using the imaging device.

Moreover, there has also been proposed a technology for directly browsing the document information as described above by using a portable terminal, such as a cellular phone and a PDA, having a display screen without converting the document information into the JPEG file (refer to Japanese Patent application Laid-open Publication No. 2006-78664).

However, in the case of the above-described technology and the like, difficulty in design thereof has been high because specifications of the document information are extremely detailed.

Therefore, it has been difficult to directly display the document information, and to display the document information in the same way as in the case of creating the document information in the PC.

Moreover, in the case of the display system that transfers the document information converted into the JPEG file to the imaging device and browses the document information thereon, the information concerned has been stored as mere image information.

Therefore, in the case of document information composed of a plurality of pages, it has been necessary to find desired image information in a recording unit, and a user has not been able to browse the image information efficiently.

SUMMARY OF THE INVENTION

One of the preferable embodiments of the invention is a display device, comprising: an information recording unit to record plural pieces of image information and image linkage information indicating a linkage among the plural pieces of image information; an image display unit to display images of the plural pieces of image information recorded in the information recording unit; an image switching instruction input unit to receive an input of an image switching instruction for switching the images displayed on the image display unit; and an image switching display control unit to allow the image display unit to display images of image information associated with one another by the image linkage information among the plural pieces of image information recorded in the information recording unit, based on the input of the image switching instruction from the image switching instruction input unit.

Another preferable embodiment of the invention is a transmission device, comprising: a recording unit to record document information; an information generating unit to generate plural pieces of image information and image linkage information indicating a linkage among the plural pieces of image information from the document information stored in the recording unit; and an information transmission unit to transmit the plural pieces of image information and the image linkage information, which are generated by the information creation unit, to a predetermined external device.

Another preferable embodiment of the invention is a display system, comprising: a display device to display an image based on image information; and a transmission device to transmit data to the display device, wherein the transmission device includes: a recording unit to record document information; an information generating unit to generate plural pieces of image information and image linkage information indicating a linkage among the plural pieces of image information from the document information recorded in the recording unit; and an information transmission unit to transmit the plural pieces of image information and the image linkage information, which are generated by the information creation unit, to the display device, and the display device includes: an information receiving unit to receive the plural pieces of image information and the image linkage information, which are transmitted from the information transmission unit; an information recording unit to record the plural pieces of image information and the image linkage information, which are received by the information receiving unit; an image display unit to display images of the plural pieces of image information recorded in the information recording unit; an image switching instruction input unit to receive an input of an image switching instruction to switch the images displayed on the image display unit; and an image switching display control unit to allow the image display unit to display the images of the image information associated with one another by the image linkage information among the plural pieces of image information recorded in the information recording unit, based on the input of the image switching instruction from the image switching instruction input unit.

Another preferable embodiment of the invention is a display method for displaying an image by using a display device including an image recording unit to record plural pieces of image information and image linkage information indicating a linkage among the plural pieces of image information, and including an image display unit to display an image of the plural pieces of image information recorded in the information recording unit, the method comprising the steps of: recording the plural pieces of image information and the image linkage information in the information recording unit; displaying the images on the image display unit; receiving an input of an image switching instruction to switch the images displayed on the image display unit; and displaying images of image information associated with one another by the image linkage information among the plural pieces of image information recorded in the information recording unit based on the input of the image switching instruction.

Another preferable embodiment of the invention is a transmission method for transmitting document information to a predetermined external device by using a transmission device including a storage unit to store the document information, a conversion unit to convert the document information into information displayable on a predetermined external device, and a transmission unit to transmit predetermined information to the external device, the method comprising the steps of: generating plural pieces of image information and image linkage information indicating a linkage among the plural pieces of image information from the document information by the conversion unit; and transmitting the created plural pieces of image information and image linkage information to the external device by the transmission unit.

Another preferable embodiment of the invention is a display method for displaying an image by using a display system including a display device to display an image based on image information, and including a transmission device to transmit data to the display device, wherein the transmission device performs the steps of: generating plural pieces of image information and image linkage information indicating a linkage among the plural pieces of image information based on document information; and transmitting the plural pieces of image information and the image linkage information from an information transmission unit to the display device, the display device includes: an information receiving unit to receive the plural pieces of image information and the image linkage information, which are transmitted from the information transmission unit; an information recording unit to record the plural pieces of image information and the image linkage information, which are received by the information receiving unit; and an image display unit to display images of the plural pieces of image information recorded in the information recording unit, and the display device performs the steps of: recording the plural pieces of image information and the image linkage information in the information recording unit; displaying the images on the image display unit; receiving an input of an image switching instruction to switch the images displayed on the image display unit; and displaying images of image information associated with one another by the image linkage information among the plural pieces of image information recorded in the information recording unit based on the input of the image switching instruction.

Another preferable embodiment of the invention is a computer-readable medium embodying a program for causing a display device which includes an information recording unit to record image information, and an image display unit to display images of the image information recorded in the information recording unit, to realize the functions of: recording plural pieces of the image information and image linkage information indicating a linkage among the plural pieces of image information in the information recording unit; displaying the images on the image display unit; and allowing the image display unit to display images of image information associated with one another by the image linkage information among the plural pieces of image information recorded in the information recording unit, based on an input of an image switching instruction to switch the images displayed on the image display unit.

Another preferable embodiment of the invention is a computer-readable medium embodying a program for causing a transmission device which transmits data to a display device to display images based on image information, to realize the functions of: generating plural pieces of image information and image linkage information indicating a linkage among the plural pieces of information based on document information; determining whether or not a connection unit of the transmission device and the display device are connected to each other; and transmitting, to the display device, the generated plural pieces of image information and image linkage information when it is determined that the connection device and the display device are connected to each other.

BRIEF DESCRIPTION OF THE DRAWINGS

FIG. 5 is a view showing linkage information composing the album information of FIG. 3.

FIG. 13 is a view showing linkage information composing the album information of FIG. 12.

DETAILED DESCRIPTION OF PREFERRED EMBODIMENT

A description will be made below of a specific aspect of the present invention by using the drawings. However, the scope of the invention is not limited to the illustrated examples.

A display system 100 of this embodiment is one to create, as album information A, a plurality of image files G and a play list P including image linkage information indicating a linkage among these image files G from document information 14*a* by a display control device 1, to switch the image files G of the album information A based on the image linkage information, and to display the image files G on a digital camera 2.

Figure 1:
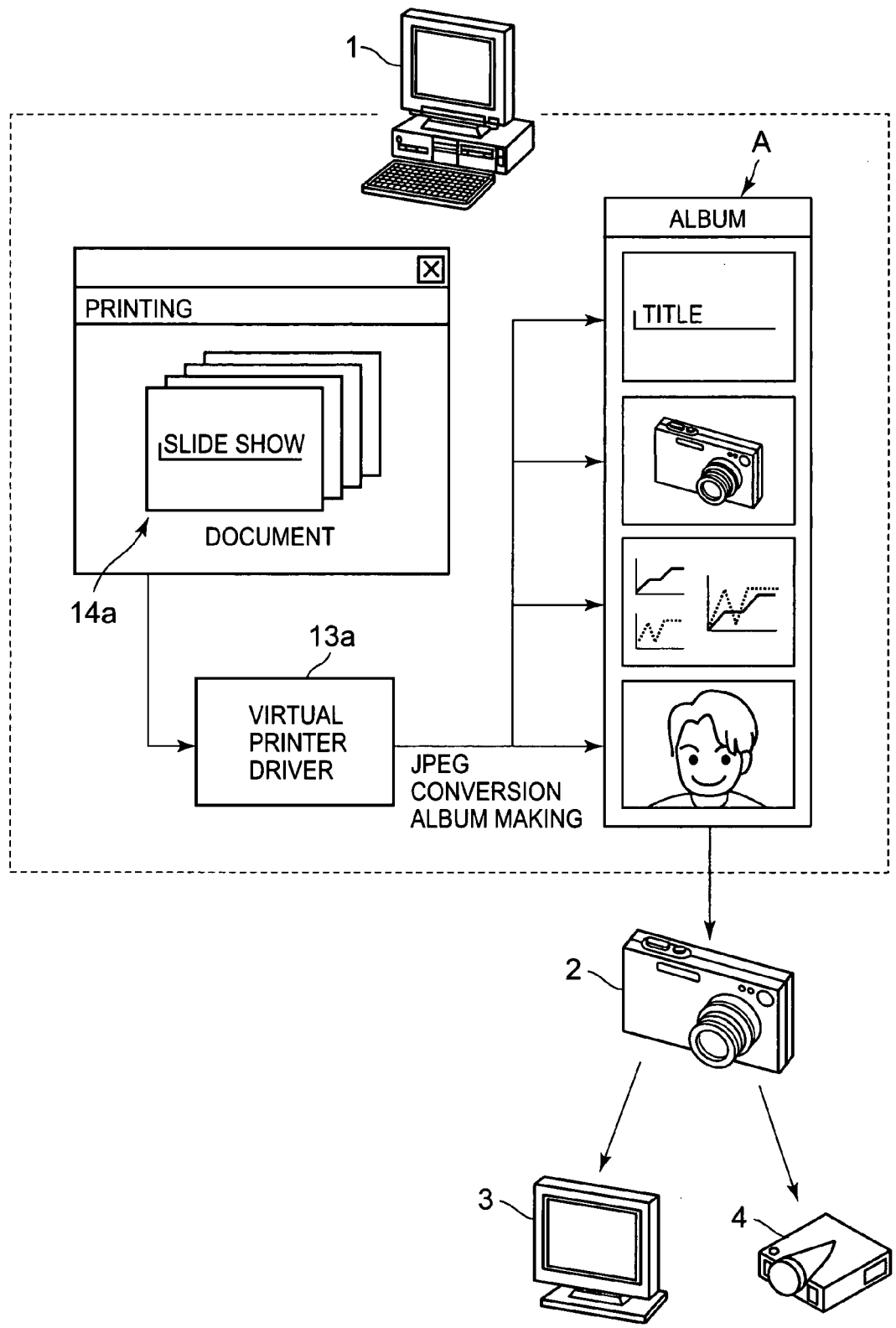
FIG. 1 is a view schematically showing a configurational outline of a display system of an embodiment to which the present invention is applied.

FIG. 1 is a view schematically showing a configuration outline of the display system of this embodiment to which the present invention is applied.

As shown in FIG. 1, the display system 100 includes the digital camera (display device) 2 that displays images based on image information, and the display control device (transmission device) 1 connected to the digital camera 2 through a communication cable (not shown).

First, a description will be made of the display control device 1 with reference to FIG. 2 to FIG. 5.

Figure 2:
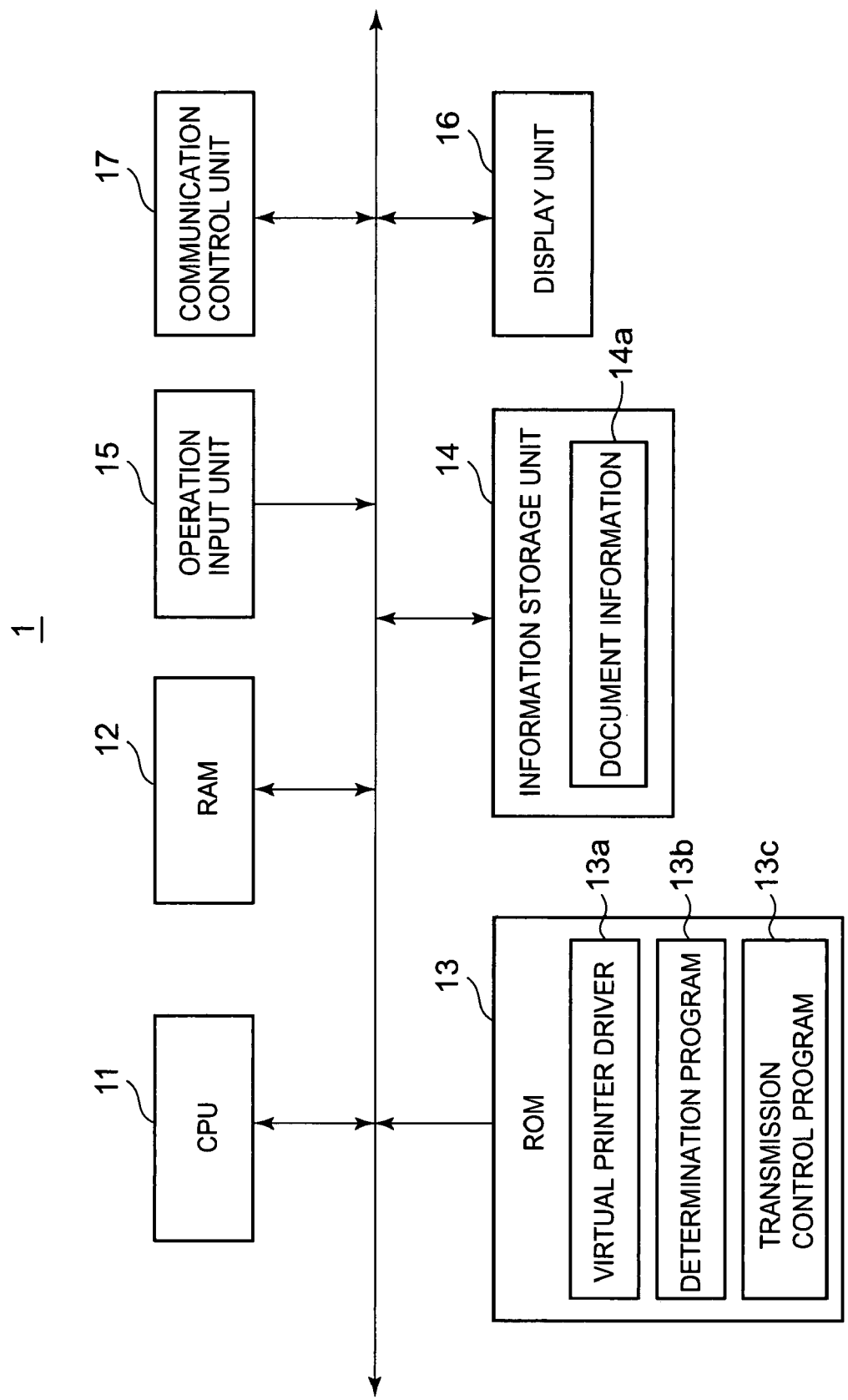
FIG. 2 is a block diagram showing a main configuration of a display control device composing the display system of FIG. 1.

FIG. 2 is a block diagram showing a main configuration of the display control device 1.

A personal computer or the like is applied as the display control device 1. Specifically, as shown in FIG. 2, the display control device 1 includes a CPU 11, a RAM 12, a ROM 13, an information storage unit 14, an operation input unit 15, a display unit 16, and a communication control unit 17, and the like.

The communication control unit 17 composes a connection unit connected to a USB terminal 241 of the digital camera 2 through the predetermined communication cable or the like.

Moreover, the communication control unit 17 is one to perform a control for making an information communication with the digital camera 2. The communication unit 17, as an information transmission unit, is configured to transmit the plurality of image files G and the play list P, which are created in album creation processing (to be described later) by the CPU 11, as the album information A to the digital camera 2.

The display unit 16 includes a display screen composed of an LCD, a CRT, or the like, and displays the document information 14a and the like, which are recorded in the information storage unit 14.

The operation input unit 15 includes a keyboard composed of data input keys for inputting numeric values, characters, and the like, and of upward, downward, left and right moving keys, various function keys and the like for performing data selection and scroll operations, and the like. The operation unit 15 outputs depression signals of the keys depressed by a user to the CPU 11.

The information storage unit 14 is composed of a hard disk device and the like, and stores the document information 14a converted into an album in the album creation processing, and the like.

Here, the document information 14a is information formed of a plurality of pages composed of information of documents, images, and the like.

The CPU 11 is one to read out a variety of programs regarding functions of the display control device 1, which are stored in the ROM 13, to expand the read programs onto a work area of the RAM 12, and to execute various pieces of processing in accordance with the programs concerned.

The RAM 12 is a rewritable memory, and composes a storage area, the work area, and the like for the programs read out from the ROM 13, the input data, received data, and the like.

Moreover, the RAM 12 includes, as a temporal storage unit, a transfer waiting list (not shown) that temporarily stores the album information A when it is determined in determination processing that the communication control unit 17 and a communication control unit 24 of the digital camera 2 are not connected to each other.

The ROM 13 is a read-only memory, and stores the variety of programs executed under the control of the CPU 11, and data, tables, and the like, which are related to the processing of the respective programs.

Specifically, the ROM 13 stores a virtual printer driver 13a, a determination program 13b, a transmission control program 13c, and the like.

The virtual printer driver 13a is a program that allows the CPU 11 to function as an information creation unit.

Specifically, the virtual printer driver 13a is a program that allows the CPU 11 to realize a function related to the album creation processing for acquiring the document information 14a from the information storage unit 14 and creating the plurality of image files G and the play list P including the image linkage information indicating the linkage among the plurality of image files G from the document information 14a.

Specifically, based on the execution of the virtual printer driver 13a by the CPU 11, as the album information A, there are created the plurality of JPEG image files G having file names which conform to the DCF standard, and the play list P associated with the JPEG image files G.

In such a way, even if the digital camera 2 does not have a function to display the album, the digital camera 2 can display images related to the JPEG image files G which conform to the DCF standard.

A description will be made of the album information A with reference to FIG. 3 to FIG. 5.

Figure 3:
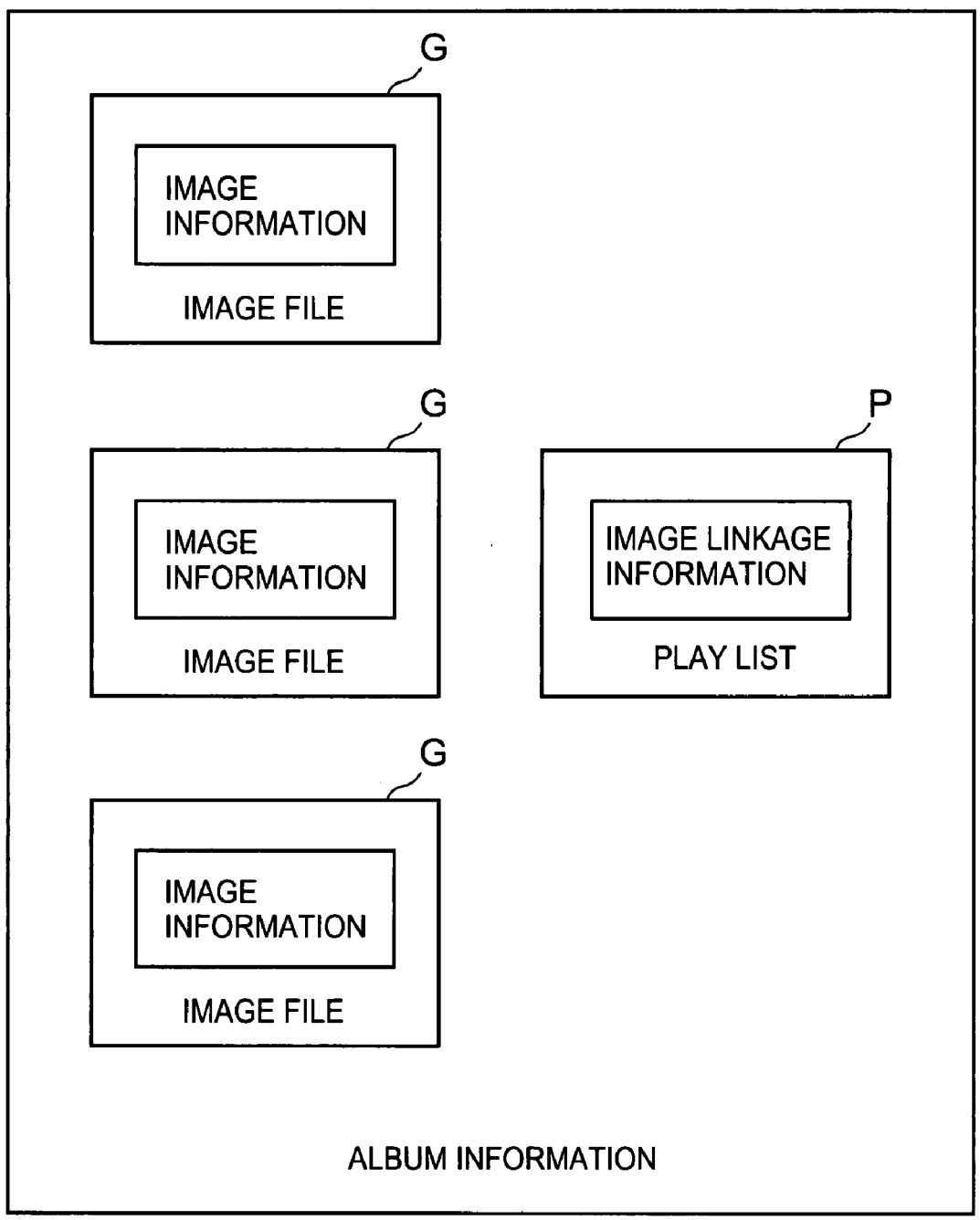
FIG. 3 is a view schematically showing a structure of album information created by the display control device of FIG. 2.
Figure 4:
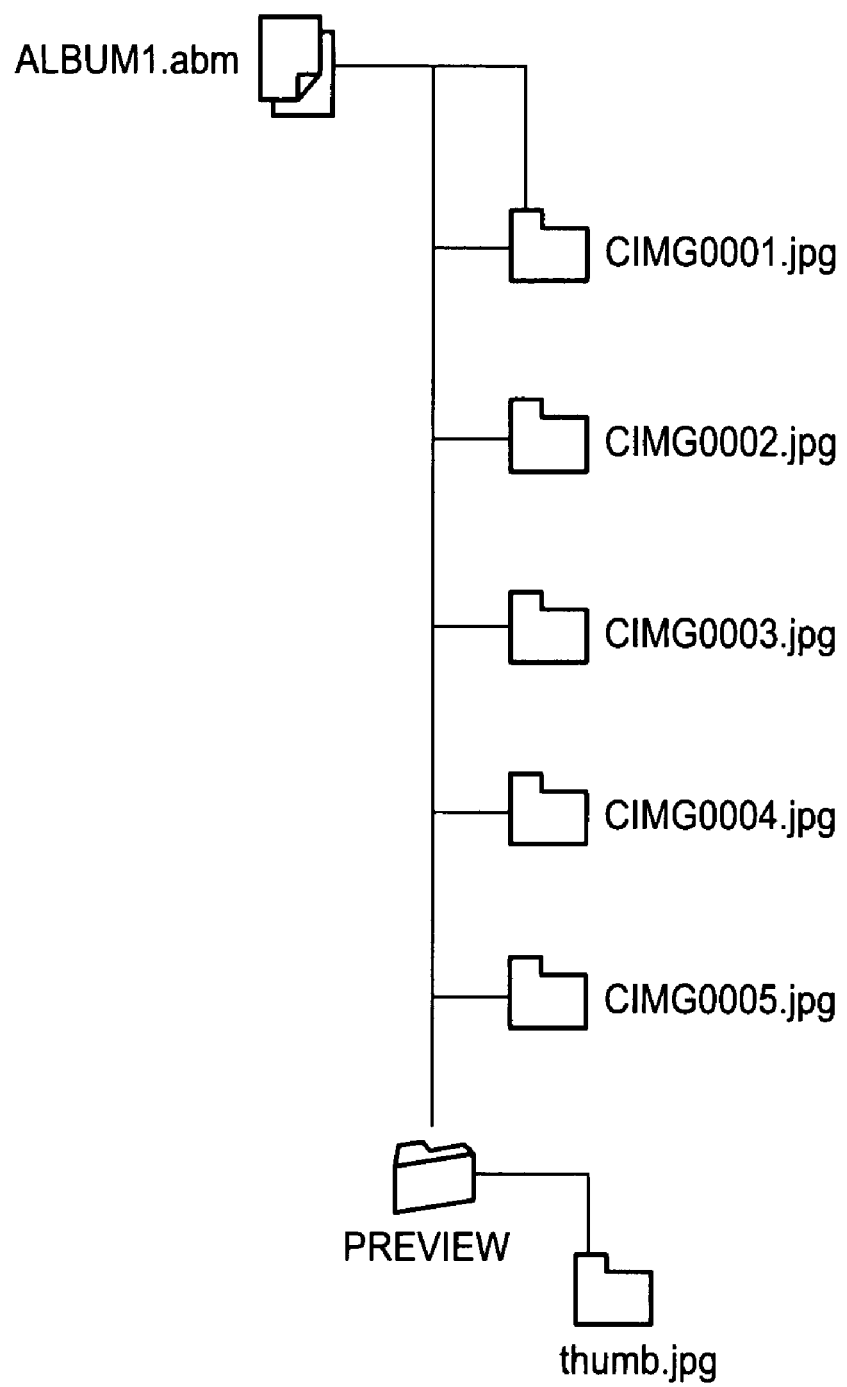
FIG. 4 is a view showing the structure of the album information of FIG. 3.

FIG. 3 is a view schematically showing a structure of the album information A, and FIG. 4 is a view showing the structure of the album information A.

Moreover, FIG. 5 is a view showing the image linkage information composing the album information A of FIG. 3.

As shown in FIG. 3 and FIG. 4, the album information A is composed by including the plurality of image files G having JPEG image information, the play list P including the image linkage information indicating the linkage among these image files G, and the like.

Specifically, as shown in FIG. 4 and FIG. 5, all five image files G (CIMG0001.jpg to CIMG0005.jpg) and the one play list P (ALBUM1.abm) are associated with each other.

Moreover, the play list P is associated with a thumbnail image file (thumb.jpg) for previewing the album information A.

As shown in FIG. 5, the play list P is described in the XML. In the play list P, there are described: contents information (<contents>; image linkage information, including information as to which contents correspond to which page) of the JPEG image files G composing the album information A; URI information (<uri>) indicating a location of the document (original.ppt); title information (<title>); author information (<author>); creation date information (<date>); thumbnail information (<img view="thumbnail">); page attribute information () indicating the entire number of pages; and the like.

In addition, the image linkage information does not have to have page information.

The determination program 13b is a program that allows the CPU 11 to function as a determination unit.

Specifically, the determination program 13b is a program that allows the CPU 11 to realize a function related to the determination processing for determining whether or not the communication control unit 17 and the communication control unit 24 of the digital camera 2 are communicably connected to each other through the communication cable.

The transmission control program 13c is a program for allowing the CPU 11 to realize a function related to processing for transmitting the plurality of image files G and the play list P from the communication control unit 17 to the digital camera 2.

Specifically, when it is determined in the determination processing that the communication control unit 17 and the communication control unit 24 of the digital camera 2 are connected to each other, the CPU 11 executes the transmission control program 13c, and transmits the plurality of image files G and the play list P, which are created in the album creation processing, as the album information A from the communication control unit 17 to the digital camera 2.

Meanwhile, when it is determined in the determination processing that the communication control unit 17 and the communication control unit 24 of the digital camera 2 are not connected to each other, and thereafter, when it is determined in the following determination processing that the communication control unit 17 and the communication control unit 24 of the digital camera 2 are connected to each other, the CPU 11 executes the transmission control program 13c, and transmits the album information A stored in the RAM 12 from the communication control unit 17 to the digital camera 2.

In such a way, the album information A can be surely transferred from the display control device 1 to the digital camera 2 in a state where the display control device 1 and the digital camera 2 are connected to each other so as to be capable of communicating the information therebetween.

Next, a description will be made of the digital camera 2 with reference to FIG. 6.

Figure 6:
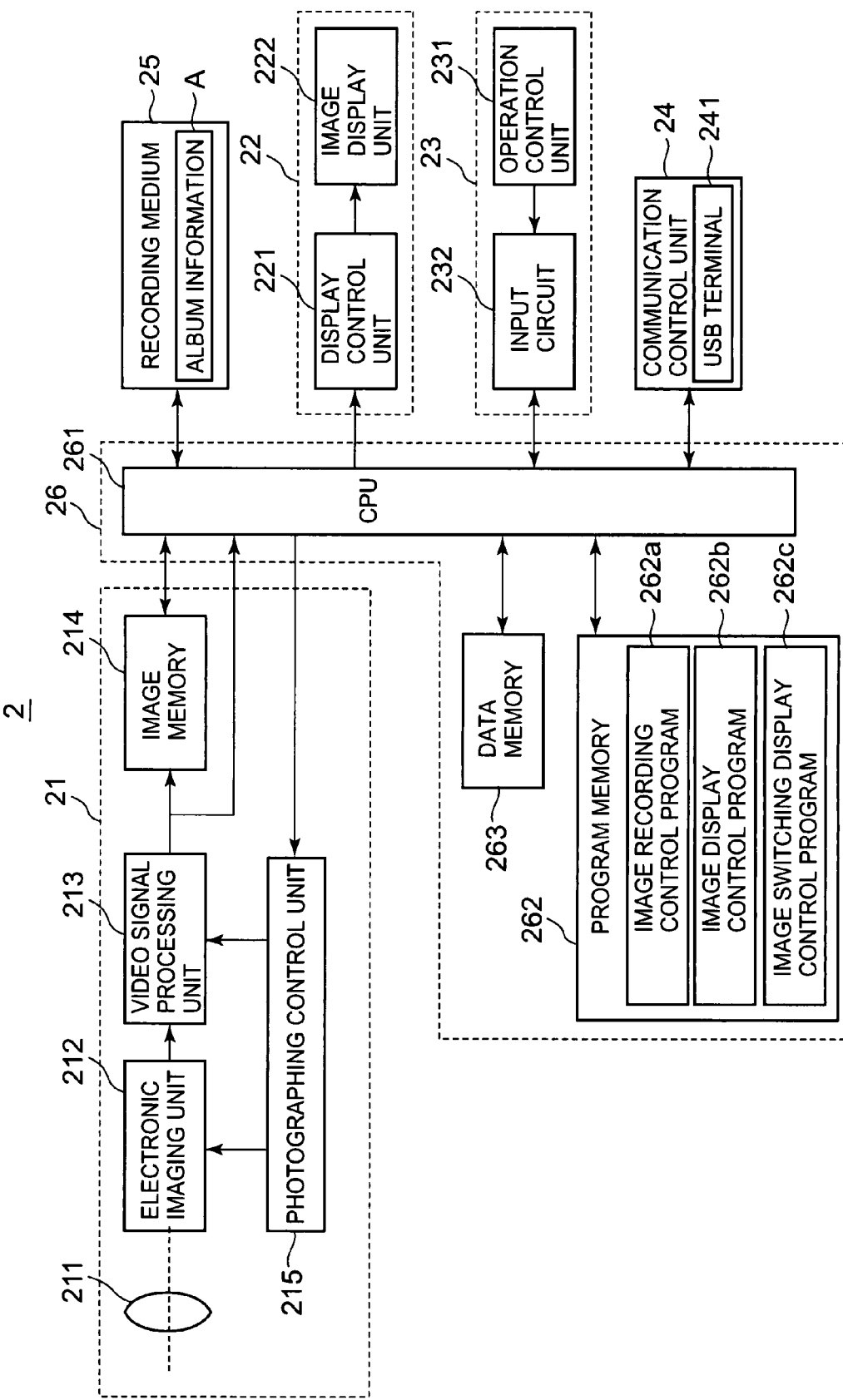
FIG. 6 is a block diagram showing a main configuration of a digital camera composing the display system of FIG. 1.

FIG. 6 is a block diagram showing a main configuration of the digital camera 2.

As shown in FIG. 6, the digital camera 2 is composed by including an imaging unit 21 that images a subject, a display unit 22 that displays such an image taken by the imaging unit 21, an operation unit 23 for performing predetermined operations of the digital camera 2, a communication control unit 24 that performs a control for making the information communication with the display control device 1, a recording medium 25 that records the taken image, a control unit 26 that controls these respective units, and the like.

Moreover, the digital camera 2 can output various pieces of information to a display instrument 3 and a projector 4 (for both, refer to FIG. 1) by being connected thereto through an external connection terminal (not shown).

The imaging unit 21 includes an imaging lens group 211 having a focus function and a zoom function and formed of a plurality of imaging lenses, an electronic imaging unit 212 formed of a charge coupled device (CCD), a complementary metal-oxide semiconductor (CMOS), or the like, which converts the subject image that has passed through the imaging lens group 211 into a two-dimensional image signal, a video signal processing unit 213 that implements predetermined image processing for the image signal outputted from the electronic imaging device 212, an image memory 214 that temporarily stores the image signal having subjected to the image processing, a photographing control unit 215 for controlling the electronic imaging unit 212 and the video signal processing unit 213 under a control of a CPU 261, and the like.

The operation unit 23 is provided on portions of the digital camera 2, and includes an operation input unit 231 an input circuit 232, and the like.

The operation input unit 231 includes a variety of operation switches (not shown), such as a cursor key and a shutter button. The shutter button is to instruct to image the subject by the imaging unit 21 based on a predetermined operation by the user.

The input circuit 232 is to input an operation signal inputted from the operation input unit 231 to the CPU 261.

As an image switching instruction input unit, the operation input unit 231 inputs an image switching instruction that instructs to switch the images displayed in an album display mode.

Moreover, the operation input unit 231 composes an album information selection unit that selects desired album information A from a list of the album information A displayed on an image display unit 222 (to be described later) in the album display mode.

The communication control unit 24 includes the USB terminal 241 connected to the display control device 1 through the communication cable.

Moreover, as an information receiving unit, the communication control unit 24 receives the plurality of image files G and the play list P, which are transmitted from the communication control unit 17 of the display control device 1, as the album information A.

As the recording medium 25, a card-type nonvolatile memory (flash memory), a hard disk, and the like can be applied.

Moreover, as an information recording unit, the recording medium 25 records the plurality of image files G and the play list P, which are received by the communication control unit 24, as the album information A.

The display unit 22 includes a display control unit 221 including a video memory (VRAM) that temporarily stores display data appropriately outputted from the CPU 261, and includes an image display unit 222, such as a liquid crystal monitor, that displays a predetermined image based on an output signal from the display control unit 221.

The image display unit 222 composes an image display unit that displays images related to the plurality of image files G recorded in the recording medium 25.

Specifically, as an album information display unit, the image display unit 222 displays the list of the album information A formed of the plurality of image files G and the play list P in album display processing.

Specifically, the image display unit 222 displays a list of thumbnail images or titles based on the thumbnail information and the title information in the image linkage information of the play list P.

Moreover, the image display unit 222 displays an image composing the desired album information A selected from the list of the album information A based on the predetermined operation of the operation input unit 231 by the user.

The control unit 26 includes the CPU 261 that performs a centralized control for the respective units of the digital camera 2, a program memory 262 that stores varieties of programs and data, which are necessary for the operation of the CPU 261, and a data memory 263 as a built-in flash memory for storing the image data.

The program memory 262 stores an image recording control program 262a, an image display control program 262b, and an image switching display control program 262c.

The image recording control program 262a is a program for allowing the CPU 261 to realize a function related to processing for recording, in the recording medium 25, the album information A formed of the plurality of image files G and the play list P, which are received by the communication control unit 24.

The image display control program 262b is a program for allowing the CPU 261 to realize a function related to the album display processing for displaying, on the image display unit 222, the images related to the plurality of image files G composing the album information A recorded in the recording medium 25.

The image switching display control program 262c is one to allow the CPU 261 to function as an image switching display control unit.

Specifically, the image switching display control program 262c is a program for allowing the CPU 261 to realize a function related to image switching display processing for displaying, on the image display unit 222, images related to image files G associated with one another by the image linkage information of the play list P among the plurality of image files G recorded in the recording medium 25 upon receiving the image switching instruction based on the predetermined operation of the operation input unit 231 by the user.

Next, a description will be made of album transfer processing by the display control device 1 with reference to FIG. 7 and FIG. 8.

Figure 7:
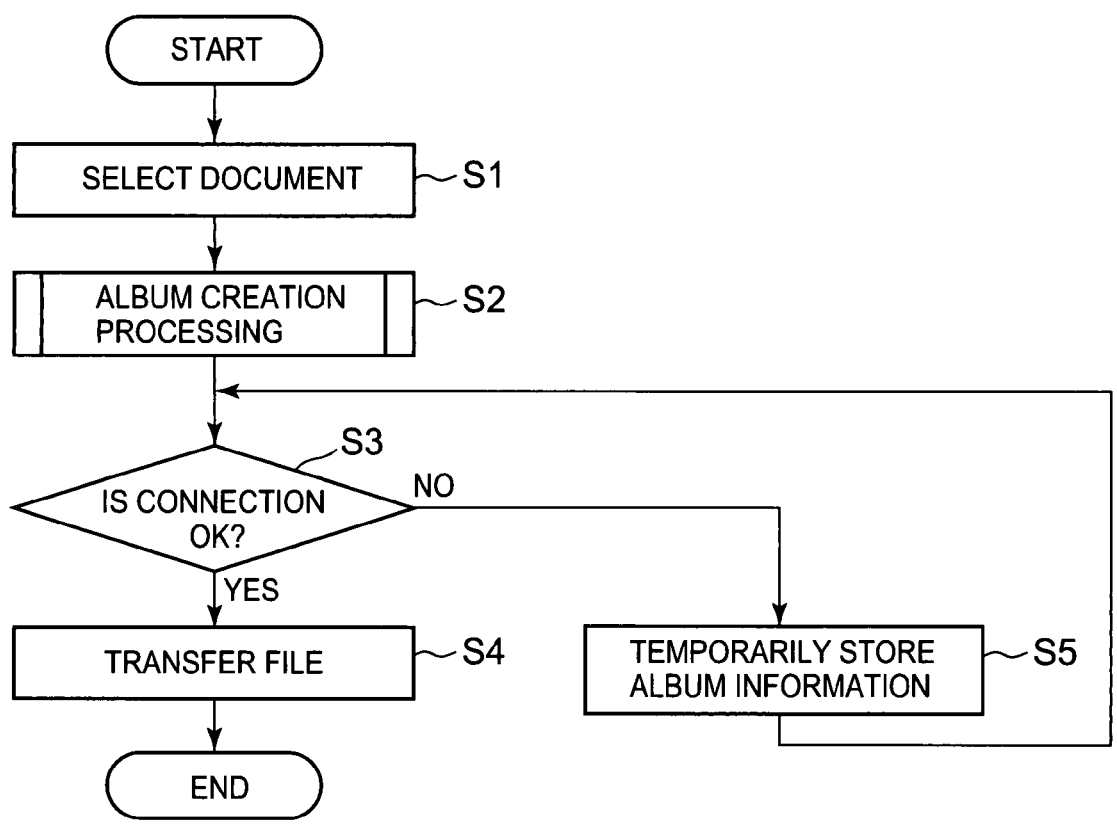
FIG. 7 is a flowchart showing an example of operations related to album transfer processing by the display control device of FIG. 2.

Here, FIG. 7 is a flowchart showing an example of operations related to the album transfer processing.

Figure 8:
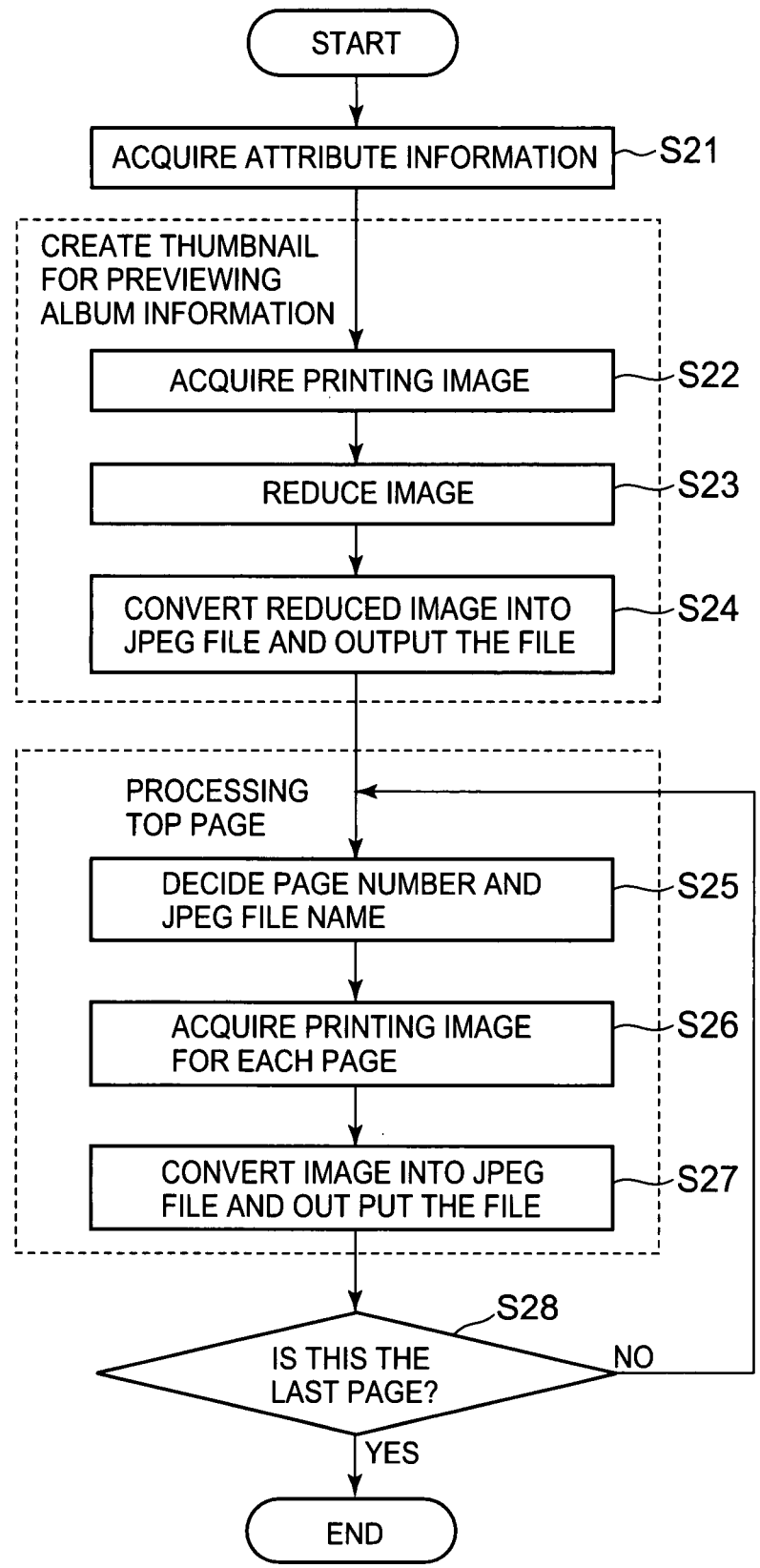
FIG. 8 is a flowchart showing an example of operations related to album creation processing by the display control device of FIG. 2.

Moreover, FIG. 8 is a flowchart showing an example of operations related to the album creation processing.

As shown in FIG. 7, when any one piece of the document information 14a stored in the information storage unit 14 is selected based on the predetermined operation of the operation input unit 15 by the user (Step S1), the CPU 11 reads out the virtual printer driver 13a from the ROM 13, followed by execution thereof, and executes the album creation processing for creating the album information A (Step S2).

More specifically, first, the list of the document information stored in a predetermined folder in the personal computer is displayed as icons.

The user selects a predetermined icon from among these icons, thereby calls out the desired document information 14a, and prints the document concerned therewith. In such a way, the album information A is created.

Specifically, the document printing is performed by selecting such a special virtual printer driver for creating the album information A, whereby the album information A is created.

When the album information A is created, the created data may be displayed also on the personal computer, thereby allowing the user to confirm the created data. In such a way, the user can confirm that the album information is created.

A description will be made below in detail of the album creation processing with reference to FIG. 8.

As shown in FIG. 8, the CPU 11 acquires attribute information such as the page attribute information, the author information, the title information, and the creation date information for each of the plurality of pages composing the document information 14a based on execution of a predetermined application program for reproducing the document information 14a (Step S21).

Next, the CPU 11 creates preview-use thumbnail images. Specifically, the CPU 11 acquires printing images formed of the plurality of pages composing the document information 14a (Step S22), reduces the printing image of a first page (Step S23), and thereafter, creates and outputs the JPEG image files G (Step S24).

Subsequently, the CPU 11 executes processing for each page.

Specifically, the CPU 11 decides a page number and a file name that conforms to the DCF standard for each of a plurality of the printing images based on the page attribute information (Step S25), and acquires the printing image of each of the plurality of pages (Step S26).

Thereafter, the CPU 11 creates the JPEG image files G, and outputs, as the album information A, the JPEG image files G and the play list P including the image linkage information such as the page attribute information (Step S27).

The above-described processing for each page is repeatedly executed until the last page is processed by the CPU 11.

Specifically, when it is determined in Step S28 that a page that is being processed by the CPU 11 is not the last page (Step S28: NO), the processing returns to Step S25, from which the processing for each page is repeatedly executed. Meanwhile, when it is determined that the page under the processing is the last page (Step S28: YES), the album creation processing is ended.

Next, the CPU 11 reads out the determination program 13b from the ROM 13, and determines whether or not the communication control unit 17 of the display control device 1 and the communication control unit 24 of the digital camera 2 are connected to each other so as to be capable of communicating the information therebetween (Step S3).

Here, when it is determined that both of the communication units are connected to each other so as to be capable of communicating the information therebetween (Step S3: YES), the CPU 11 executes the transmission control program 13c, copies the plurality of image files G and the play list P, which are created in the album creation processing, and transmits the copied files and list as the album information A from the communication control unit 17 to the digital camera 2 (Step S4).

Meanwhile, when it is determined that both of the communication units are not connected to each other so as to be capable of communicating the information therebetween (Step S3: NO), the CPU 11 executes (provisional storage) processing for temporarily storing the album information A in the transfer waiting list of the RAM 12 (Step S5).

Note that, though a configuration in which the album information A is temporarily stored is adopted here, a configuration may be adopted, in which the album information A is not temporarily stored, but an error message is outputted.

Moreover, a configuration may be adopted, in which a message telling that both of the communication units are not connected to each other is displayed as well as the album information A is temporarily stored.

Furthermore, a configuration may be adopted, in which the above-described data is recorded in a memory card, and the memory card is moved from the display control device 1 to the digital camera 2, whereby the data is transferred therebetween. In this case, if only the memory card is connected to the display control device 1, then it is regarded that the connection of Step S3 is made.

Next, a description will be made of the album display processing by the digital camera 2 with reference to FIG. 9.

Figure 9:
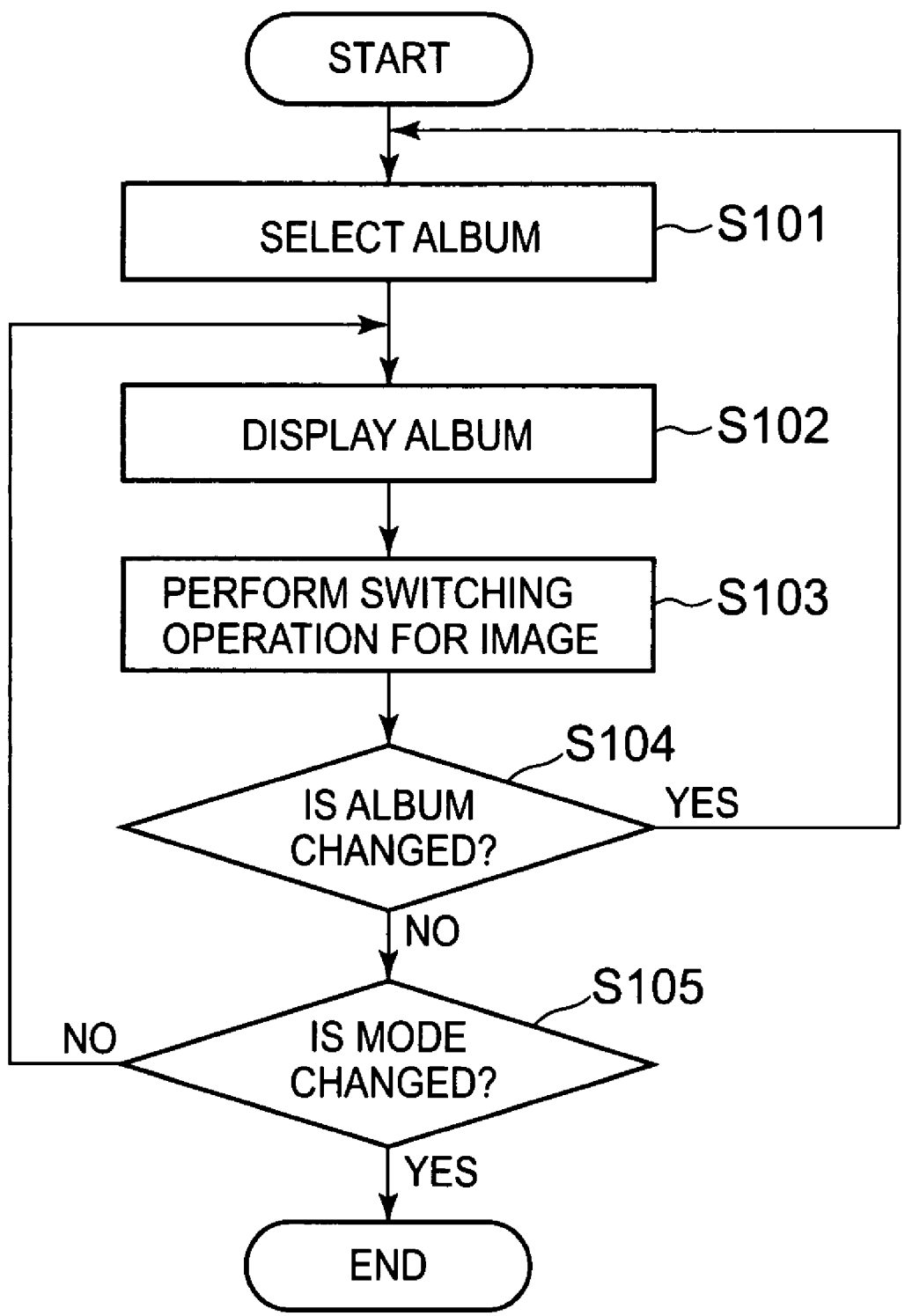
FIG. 9 is a flowchart showing an example of operations related to album display processing by the digital camera of FIG. 6.

Here, FIG. 9 is a flowchart showing an example of operations related to the album display processing.

When the digital camera 2 is set at the album display mode based on the predetermined operation of the operation input unit 231 by the user, the CPU 261 searches the recording medium for the play list P of the album information A, and displays the play lists P thus found in accordance with display setting conditions of the image display unit 222.

Moreover, when any one play list P is selected from among the displayed play lists P based on the predetermined operation of the operation input unit 231 by the user (Step S101), the CPU 261 displays the images related to the image files G associated with the play list P on the image display unit 222 based on the execution of the image display control program (Step S102).

Here, the image linkage information and the page information, which are related to the image files G associated with the play list P, may be displayed together with the images related to the image files G associated with the play list P.

Here, when the image switching instruction is inputted to the digital camera 2 based on the predetermined operation of the operation input unit 231 by the user, the CPU 261 acquires the predetermined image file G associated with the play list P from the recording medium and displays the image related to the image file G concerned on the image display unit 222 based on the execution of the image switching display control program (Step S103).

Note that, when the image is reproduced and displayed, the CPU 261 may control the image display unit 222 to display the page attribute information, title information, author information, creation date information, and the like of the play list P in a superimposing manner on the image.

Moreover, not only the image is switched to the next page by receiving the image switching instruction, but also the image may be switched to the previous page, a table of contents, and a bookmarked page. In such a way, convenience of the digital camera 2 can be further enhanced.

Moreover, when an instruction to change the album is inputted to the digital camera 2 based on a predetermined operation of the operation input unit 231 by the user (Step S104: YES), the CPU 261 moves to Step S101, and controls the execution of the processing from Step S101.

Meanwhile, when the instruction to change the album is not inputted in Step S104 (Step S104: NO), the CPU 261 determines whether or not the display mode is instructed to be changed based on a predetermined operation of the operation input unit 231 by the user (Step S105). Then, the CPU 261 executes processing for displaying, on the image display unit 222, the images related to the image files G composing the album information A selected in Step S101 until the instruction to change the display mode is inputted. The change of the display mode is, for example, to change the display mode from reproduction mode to camera mode, from album reproduction mode to normal reproduction mode, or the like.

As described above, in accordance with the display system 100 of this embodiment, the album information A formed of the plurality of JPEG image files G and the play list P can be created from the document information 14a reproduced by the display control device 1. Accordingly, the plurality of image files G can be put in order in association with the image linkage information of the play list P, and can be recorded in the recording medium 25 of the digital camera 2.

In such a way, the images related to the plurality of image files G come not to be displayed randomly, and the images can be displayed per album.

Hence, only the desired album formed of the plurality of image files G concerned can be efficiently browsed while the image files G concerned are being prevented from being mixed with the other image files G.

Moreover, the album information A is composed of the plurality of JPEG image files G and the play list P, and accordingly, it becomes unnecessary to allow the digital camera 2 to deal with application programs of the individual PCs, and restrictions on design of the digital camera 2 can be reduced.

Furthermore, the page attribute information of the document information 14a is acquired in the album creation processing, and is recorded in the play list P, whereby the desired album can be selected easily in the album display processing by the digital camera 2.

In particular, the list of the album information A can be displayed by using the thumbnail images, and accordingly, the desired album information A can be selected more easily.

Note that the present invention is not limited to the above-described embodiment, and a variety of improvements and design changes may be implemented therefor within the scope without departing from the gist of the present invention.

A description will be made below of modification examples of the display system 100.

MODIFICATION EXAMPLE 1

A display system of Modification example 1 creates the album information A from document information 14a including moving picture information, and displays the album information A on the digital camera 2.

Specifically, in the album creation processing, the display control device 1 encodes a page determined to have the moving picture among the plurality of pages composing the document information 14a into a predetermined file format such as the MPEG-4 capable of reproducing the moving picture in the digital camera 2, and outputs the page concerned.

Figure 10:
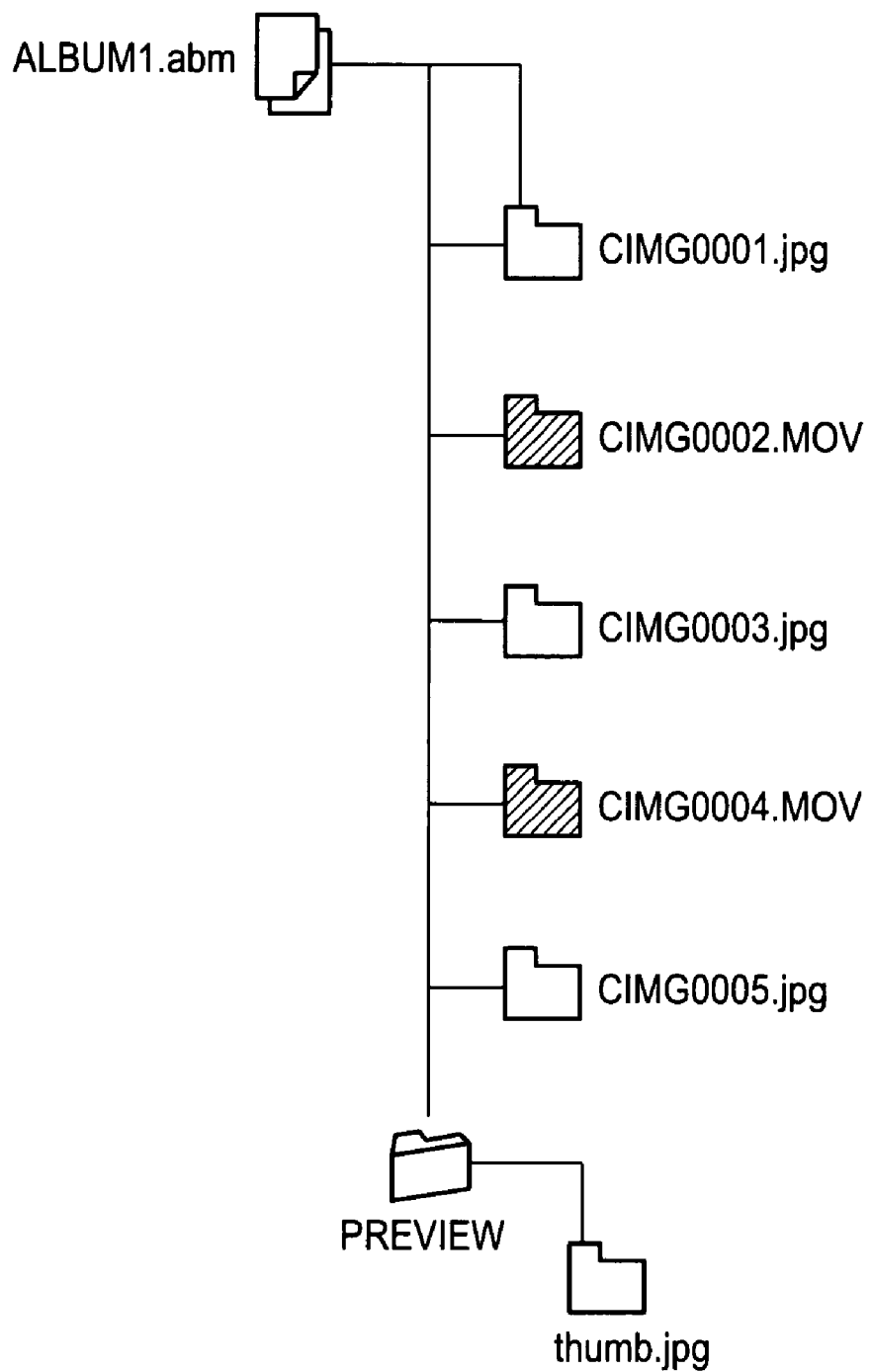
FIG. 10 is a view showing a structure of album information created by album creation processing by a display control device composing a display system of Modification example 1.

In such a way, as shown in FIG. 10, the album information A is created, which is composed of five image files G: three still image files G (CIMG0001.jpeg, CIMG0003.jpg, CIMGOO05.jpg); and two moving picture files G (CIMG0002.MOV, CIMG0004.MDV).

A description will be made of the album creation processing with reference to FIG. 11.

Figure 11:
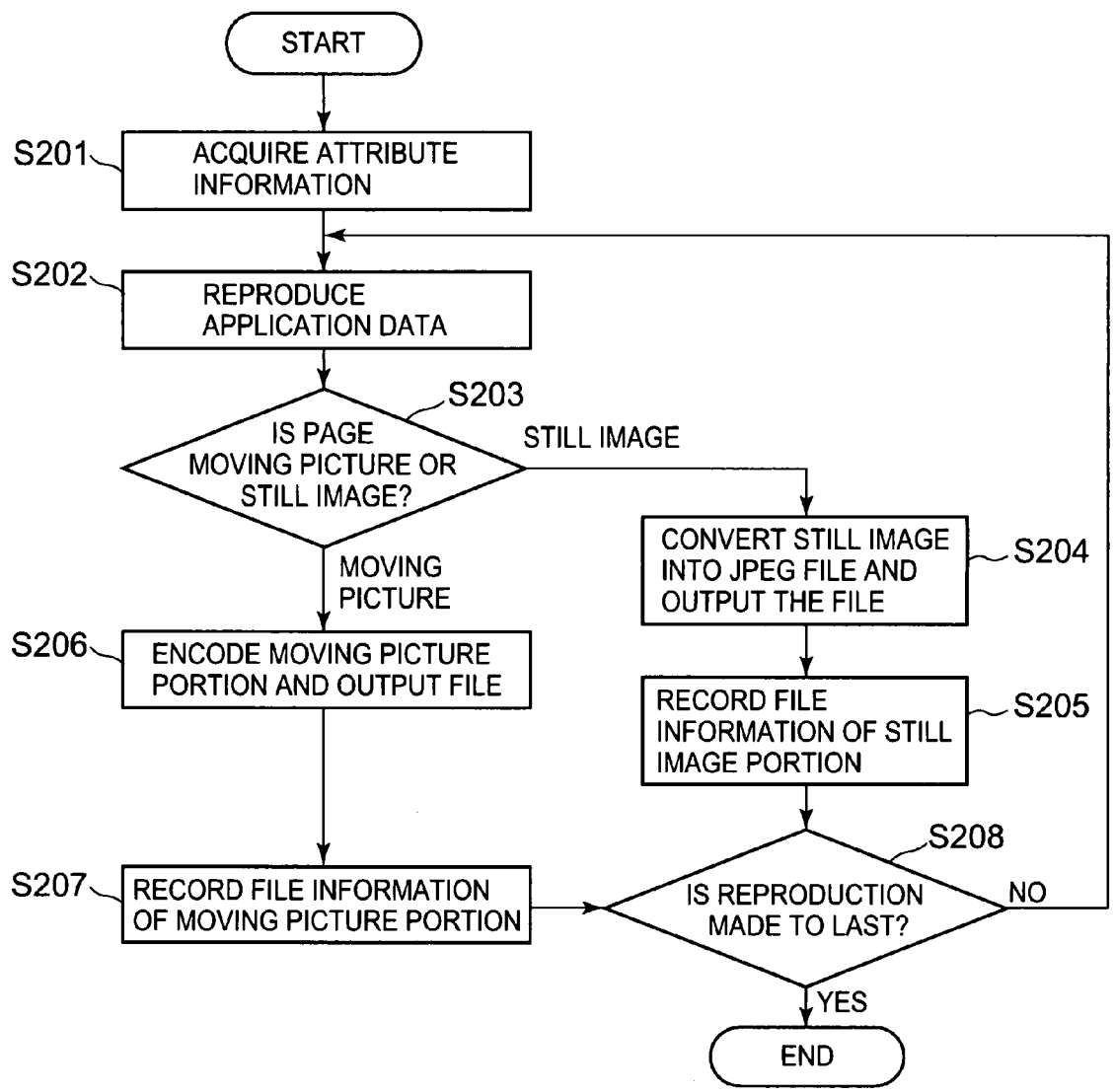
FIG. 11 is a flowchart showing an example of operations related to the album creation processing by the display control device of FIG. 10.

As shown in FIG. 11, the CPU 11 acquires page attribute information for each of the plurality of pages composing the document information 14a based on execution of a predetermined application program (Step S201).

Subsequently, the CPU 11 reproduces the document information 14a based on the execution of the application program (Step S202), and based on a result of such reproduction, determines whether each of the plurality of pages composing the document information 14a is the moving picture or the still image (Step S203).

Note that the reproduction is not limited to the case where the moving picture or the still image is actually displayed on the display unit 16 in a form visible by the user, but may be that the moving picture or the still image is set in a reproduction state in internal processing of the CPU 11.

When it is determined in Step S203 that each page is the still image (Step S203: still image), the CPU 11 decides the page number and the file name that conforms to the DCF standard for each page that is the still image based on the page attribute information, thereafter, creates the JPEG image files G, and outputs the JPEG image files G and the play list P including the image linkage information such as the page attribute information (Step S204).

Then, the CPU 11 stores the album information A related to the outputted still images in the RAM 12 (Step S205).

Meanwhile, when it is determined in Step S203 that each page is the moving picture (Step S203: moving picture), the CPU 11 decides the page number and the file name for each page that is the moving picture based on the page attribute information, thereafter, encodes each page into the predetermined file format (such as the MPEG-4), and outputs the moving picture files G thus created and the play list P including the picture linkage information such as the page attribute information (Step S206).

Then, the CPU 11 records the album information A related to the outputted moving pictures in the RAM 12 (Step S207).

The above-described processing is repeatedly executed until the document information 14a is reproduced to the last by the CPU 11. When it is determined in Step S208 that the document information 14a is not reproduced to the last by the CPU 11 (Step S208: NO), the CPU 11 moves to Step S202, from which the above-described processing is repeatedly executed. Then, when it is determined in Step S208 that the document information 14a is reproduced to the last (Step S208: YES), the CPU 11 ends the album creation processing.

As described above, even the document information 14a including the motion can be appropriately displayed on the digital camera 2.

Note that the image files G are not limited to the JPEG images which are the sill image information in the above-described embodiment or to the MPEG pictures which are the moving picture information in Modification example 1. The image file G may be sound-added still image information having sound information, or mere audio information.

MODIFICATION EXAMPLE 2

A display system of Modification example 2 can switch the images based on link information associated with predetermined pages in the pages composing the document information 14a.

Figure 12:
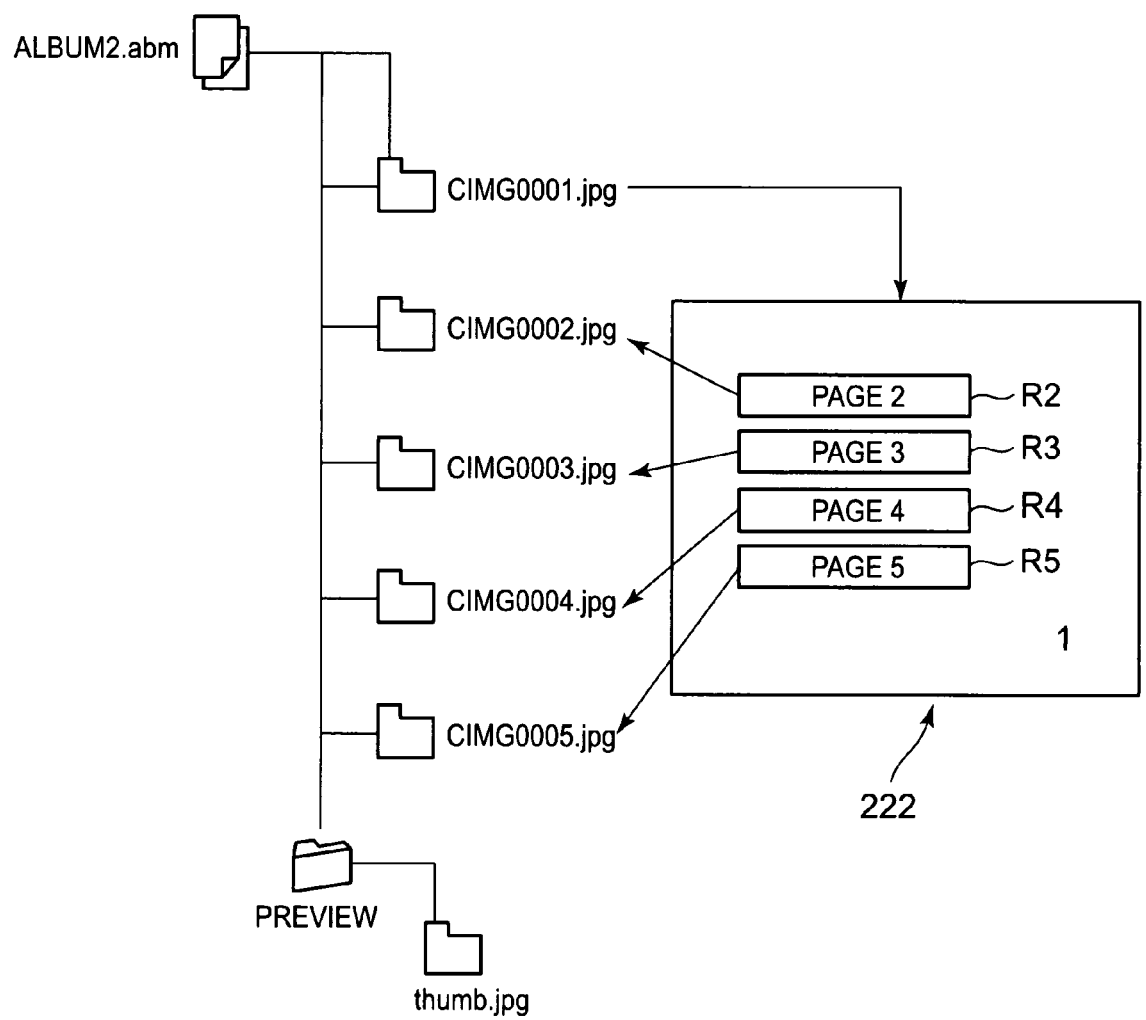
FIG. 12 is a view showing a structure of album information created by a display control device composing a display system of Modification example 2.

Specifically, as shown in FIG. 12 and FIG. 13, when pages in which the first page is a table of contents are converted into the image files G, the link information is extracted from the pages concerned, map area information linked with each of the image files G is designated by a usemap attribute of the play list P, and link destination and area are defined (<map name="maplink">) by a map element belonging to the map area information.

In such a way, as shown in FIG. 12, areas R2 to R5 in square frames, which are associated with the image files G of the second to fifth pages, are clicked in a state where the image file G of the first page is displayed on the image display unit 222, thus making it possible to switch the images to the page as the link destination.

Hence, when there is link information such as information on the table of contents, the link information can be held even if the document information is converted into the album information A, and actions close to those in such an original application program that reproduces the document information 14a can be reproduced.

Note that, the description has been made of Modification example 2 by illustrating the links in the album information A; however, a configuration may be adopted, in which the image files are linked with information other than the album information A and URLs on the Internet.

MODIFICATION EXAMPLE 3

Image files G composing album information A according to a display system of Modification example 3 are composed of the image information and the image linkage information individually associated with the image information concerned.

Figure 14:
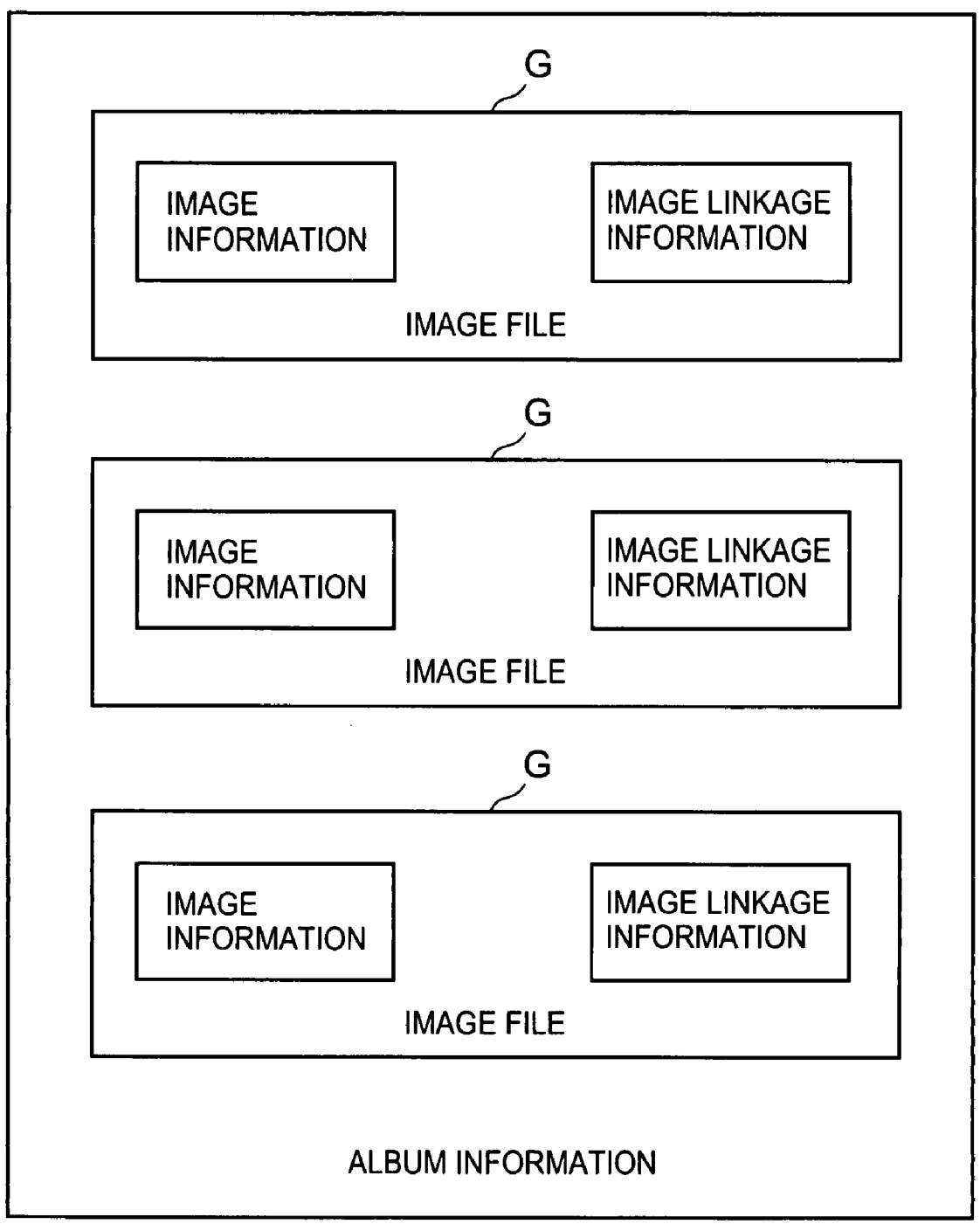
FIG. 14 is a view schematically showing a structure of album information created by a display control device composing a display system of Modification example 3.

Specifically, as shown in FIG. 14, a display control device 1 composing the display system creates image information of the exif format, and records the image linkage information as additional information to the image information.

Even if the album information A has such a configuration as described above, the plurality of image files G can be put in order in association with the image linkage information, and can be recorded in the digital camera 2. In such a way, the images related to the plurality of image files G come not to be displayed randomly, and the images can be displayed per album.

Moreover, the image display unit 222 may be used as an image linkage information display unit, and the image linkage information included in the play list P may be displayed thereon.

In such a way, a correspondence relationship among the image files G can be visually recognized when the album is reproduced by the digital camera 2.

Moreover, in the above-described embodiment, the digital camera 2 has been illustrated as the display device; however, the display device is not limited to the digital camera 2, and may be one with any configuration, such as a hard disk storage and a PDA, as long as such a display device can store the image information and has a display screen.

Moreover, in the above-described embodiment, the display system 100 has been illustrated, in which the digital camera 2 and the display control device 1 are wired-connected to each other through the communication cable; however, the display system according to the present invention is not limited to the display system 100, and the display system may have a configuration in which the digital camera 2 and the display control device 1 are wirelessly connected to each other through a predetermined wireless communication network such as a wireless LAN.

Moreover, a plurality of audio files may be managed by the computer or the like in association with one another based on the linkage information.

Specifically, the plurality of audio files recorded by the digital camera 2 provided with a recording function are transferred to the computer, and the linkage information that associates the plurality of audio files with one another is created in the album creation processing, whereby the plurality of audio files may be managed.

What is claimed is:

1. A document display system comprising:
a document creating device which is configured to create a document; and
a digital camera including:
an imaging unit which photographs an image;
a recording unit which records an image file of the photographed image obtained by the imaging unit, wherein a file name of the image file is determined in conformance with the DCF standard; and
a display unit which displays the photographed image recorded in the recording unit,
wherein the document creating device is configured to:
generate a plurality of image files by creating an image for each page of the document, wherein file names of the plurality of image files are determined in conformance with the DCF standard;
generate an information file of image linkage information indicating a linkage between the plurality of generated image files and the created document which is a source for generating the plurality of image files, wherein the image linkage information includes the file names of the plurality of generated image files; and
transmit the plurality of generated image files and the information file to the digital camera; and
wherein the digital camera is configured to:
receive the plurality of generated image files and the information file transmitted from the document creating device, and add and record the plurality of image files and the information file in the recording unit in conformance with the DCF standard; and
when the information file recorded in the recording unit is selected, display the plurality of image files, whose file names are included in the image linkage information in the selected information file, on the display unit switched sequentially based on an instruction operation by a user, and also display on the display unit, information regarding the created document which is the source for generating the plurality of image files indicated by the image linkage information in the selected information file.

2. The document display system according to claim 1, wherein the image linkage information includes at least one of URI information, title information, and author information of the created document.

3. The document display system according to claim 1, wherein:
the image linkage information includes page attribute information to indicate a page number of each of the plurality of image files generated from the document; and
the digital camera displays the page attribute information in a superimposing manner on the display unit.

4. The document display system according to claim 1, wherein the document creating device generates the information file of the image linkage information as an XML file classifying each item with a tag.

5. The document display system according to claim 1, wherein the digital camera is configured to display a plurality of album information, each of which includes a plurality of image files and a corresponding information file of image linkage information, to allow a user to make a selection.

6. The document display system according to claim 5, wherein:
   the digital camera is configured to obtain a thumbnail image associated with each of the plurality of information files;
   a list of the obtained thumbnail images is displayed to display the plurality of album information; and
   a desired thumbnail image is selected from the displayed list of the thumbnail images to select a desired item of album information.

7. The document display system according to claim 1, wherein the plurality of image files comprise at least one of still image information, and sound-added still image information including sound information and moving picture information.

8. The document display system according to claim 1, wherein:
   the document creating device generates an image file of a table of contents corresponding to the created document;
   a file name of the image file of the table of contents is determined in conformance with the DCF standard;
   an image of the table of contents places link information of the plurality of generated image files on one page; and
   the digital camera displays the image of the table of contents, and according to an instruction operation by the user on the image of the table of contents, displays a given one of the plurality of image files according to link information of an instructed position.

9. A control method for a document display system including a document creating device which is configured to create a document, and a digital camera which includes: (i) an imaging unit which photographs an image, (ii) a recording unit which records an image file of the photographed image obtained by the imaging unit, wherein a file name of the image file is determined in conformance with the DCF standard, and (iii) a display unit which displays the photographed image recorded in the recording unit, the control method comprising:

generating a plurality of image files by creating an image for each page of the document, wherein file names of the plurality of image files are determined in conformance with the DCF standard;

generating an information file of image linkage information indicating a linkage between the plurality of generated image files and the created document which is a source for generating the plurality of image files, wherein the image linkage information includes the file names of the plurality of generated image files;

transmitting the plurality of generated image files and the information file to the digital camera;

receiving at the digital camera, the plurality of generated image files and the information file transmitted from the document creating device, and adding and recording the plurality of image files and the information file in the recording unit in conformance with the DCF standard; and when the information file recorded in the recording unit is selected, displaying the received plurality of image files, whose file names are included in the image linkage information in the selected information file, on the display unit switched sequentially based on an instruction operation by a user, and also displaying on the display unit, information regarding the created document which is the source for generating the plurality of image files indicated by the image linkage information in the selected information file.

10. The control method according to claim 9, further comprising:
   generating an image file of a table of contents corresponding to the created document;
   wherein a file name of the image file of the table of contents is determined in conformance with the DCF standard, an image of the table of contents places link information of the plurality of generated image files on one page, and when the image of the table of contents is displayed on the display unit, a given one of the plurality of image files is displayed according to link information of an instructed position.

* * * * *